United States Patent [19]

Mamiya

[11] Patent Number: 5,293,242
[45] Date of Patent: Mar. 8, 1994

[54] SHORT RANGE OBJECT PHOTOGRAPHING DEVICE

[75] Inventor: Toshiharu Mamiya, Yokohama, Japan

[73] Assignee: Canon Kabushiki Kaisha, Tokyo, Japan

[21] Appl. No.: 767,659

[22] Filed: Sep. 30, 1991

[30] Foreign Application Priority Data

| Oct. 2, 1990 | [JP] | Japan | 2-265344 |
| Oct. 2, 1990 | [JP] | Japan | 2-265345 |
| Oct. 2, 1990 | [JP] | Japan | 2-265346 |
| Oct. 2, 1990 | [JP] | Japan | 2-265348 |
| Oct. 23, 1990 | [JP] | Japan | 2-286395 |

[51] Int. Cl.$^5$ .................. H04N 5/30; H04N 5/225
[52] U.S. Cl. ................... 348/362; 355/63; 354/80; 348/96; 348/370; 348/373; 358/909.1
[58] Field of Search ............ 358/229, 214, 909, 215, 358/102; 354/75, 76, 80, 81, 288, 293; 355/63, 32; 353/95, 96, 100

[56] References Cited

U.S. PATENT DOCUMENTS

| 4,076,413 | 2/1978 | Smeaton | 354/80 |
| 4,310,231 | 1/1982 | Konishi et al. | 355/63 |
| 4,458,270 | 7/1984 | Kuno et al. | 358/229 |
| 4,479,712 | 10/1984 | Pursell | 355/63 |
| 4,707,127 | 11/1987 | Goedken | 354/266 |
| 4,800,437 | 1/1989 | Hosoya | 354/76 |
| 4,831,455 | 5/1989 | Ishikawa et al. | 358/229 |
| 4,916,550 | 4/1990 | Miyake et al. | 358/229 |
| 5,028,941 | 7/1991 | Sohn | 358/229 |

FOREIGN PATENT DOCUMENTS

| 0336551 | 10/1989 | European Pat. Off. |
| 3035555 | 7/1981 | Fed. Rep. of Germany |
| 2279130 | 2/1976 | France |

Primary Examiner—Michael I. Razavi
Assistant Examiner—Wendy R. Greening
Attorney, Agent, or Firm—Fitzpatrick, Cella, Harper & Scinto

[57] ABSTRACT

A photographing device includes a camera mounting unit on which a camera is detachably mounted, a light source unit arranged at a predetermined distance from the camera mounting unit, and a table which is arranged between the light source unit and the camera mounting unit, and on which an object is placed. The object placed on the table is illuminated by the light source unit, and can be photographed by the camera.

23 Claims, 12 Drawing Sheets

SHORT RANGE OBJECT PHOTOGRAPHING DEVICE

BACKGROUND OF THE INVENTION

1. Field of the Invention

The present invention relates to a photographing device for photographing an object such as a negative film, a slide film, or the like using a camera, e.g., an electronic still camera.

2. Related Background Art

In recent years, in the field of cameras, electronic cameras such as still video cameras (to be referred to as SV cameras hereinafter) have become increasingly popular. The SV cameras have the following features. Photographed image data can be recorded on a magnetic recording medium such as a video floppy disk without performing, e.g., a development process like in silver chloride cameras, and can be immediately reproduced on a television monitor (TV monitor). Thus, the SV cameras have become popular in various fields.

A conventional camera of this type comprises various functions such as a fixed focal point photographing lens, an external finder, a built-in flash device, a closeup function, and the like. In particular, the closeup function is often utilized when documents are photographed.

Since photographed image data can be immediately reproduced on a display such as a TV monitor, the SV camera is widely used in various presentations due to its convenience and good operability in place of conventional slides.

In order to take a closeup photograph of a transmission original such as a camera film using the above-mentioned electronic still camera, a closeup lens for realizing an enlarged-scale photographing operation, a transmission illumination source for uniformly illuminating a film, and the like are required. In addition, a negative-positive reversal function for photographing a negative film is required. For these reasons, it is very difficult to take a closeup photograph of a camera film.

Since a closeup photographing operation is performed while the camera main body is set in the vicinity of an original as an object, a slight movement of the camera appears as a large movement on a screen in an enlarged-scale photographing operation.

In existing apparatuses, although an apparatus for photographing a film image, and outputting image data to a monitor display has been proposed, only a bulky, special-purpose apparatus is available. Thus, demand has arisen for development of an apparatus which can easily photograph a film image by utilizing the SV camera.

The SV camera which records a still image on a video floppy disk, and reproduces image data has high possibility of such applications.

However, if a video camera is used, image processing based on electrical signals is performed, and an image is displayed on, e.g., a monitor display, it is expected that these problems about operability will be solved.

SUMMARY OF THE INVENTION

The present invention has been made in consideration of the above situation, and has as its first object to provide a photographing device and system, which can easily take a closeup photograph of, e.g., a camera film.

In order to achieve the above object, according to a preferred aspect of the present invention, there is closed a photographing device comprising:

a camera mounting unit on which a camera can be detachably mounted;

a light source unit arranged to be separated from the camera mounting unit by a predetermined distance; and a table which is arranged between the light source unit and the camera mounting unit, and on which an object is placed, wherein the object placed on the table is illuminated by the light source unit, and can be photographed by the camera.

It is the second object of the present invention to provide a photographing device which, when a closeup photographing operation is performed using a camera, inhibits operations using operation buttons of the camera itself, and allows the operation by operation buttons of the film photographing device, thereby preventing the camera from being shaken in the closeup photographing operation.

In order to achieve the above object, according to another preferred aspect of the present invention, there is disclosed a photographing system comprising:

a camera having various operation buttons; and a film photographing device in which the camera and an object are mounted to oppose each other, and has a light source for illuminating the object, and operation buttons corresponding to the operation buttons of the camera, wherein when the camera is mounted on a film mounting portion to perform a photographing operation, the operation of the camera by the operation buttons of the camera itself is inhibited and the operation of the camera by the operation buttons of the film photographing device is enabled.

It is the third object of the present invention to provide a photographing device which allows easy confirmation of a film to be photographed without complicating the arrangement of a camera.

In order to achieve the above object, according to still another preferred aspect of the present invention, there is disclosed a photographing device for photographing an object while holding a photographing unit at a closest distance to the object, comprising an object placing unit for holding the object within a photographing enable region of the photographing unit, support means for holding the photographing unit at a predetermined closest distance from the object placing unit, shielding means, arranged on a circumferential portion of the photographing enable region, for shielding external light incident on the photographing enable region, and an opening portion which is formed in a portion of the shielding means, and through which the object can be directly visually observed.

According to still another preferred aspect of the present invention, there is disclosed a photographing device for photographing an object while holding a photographing unit at a closest distance to the object, comprising an object placing unit for holding the object within a photographing enable region of the photographing unit, holding means, having an exterior portion, for holding the photographing unit at a predetermined closest distance from the object placing unit, and for shielding external light to the photographing enable region, and an opening window which is formed in the exterior portion of the holding means, and through which the photographing enable region can be visually observed.

With this arrangement, a film in a film photographing adapter can be directly visually observed via the opening portion, no optical system for guiding an object image to a finder is required, and a finder of the camera need not be used. For this reason, a possibility that a user touches the camera is reduced accordingly, and camera-shaking can be effectively prevented. In addition, since an opening portion and various operation switches of the film photographing device can be visually observed at the same time, erroneous operations can be effectively prevented.

It is the fourth object of the present invention to provide a photographing device which can always obtain a proper exposure state by correcting, e.g., a decrease in circumferential light amount of a lens in the above-mentioned closeup photographing device for taking a closeup photograph of an object such as a film using a transmission light source.

In order to achieve the above object, according to still another preferred aspect of the present invention, there is disclosed a photographing device, comprising an object placing unit on which an object is placed, photographing means, held at a predetermined closest distance from the object placing unit, for photographing the object, illumination means for illuminating the object placed on the object placing unit, and correction means for correcting a luminance distribution of an object image incident on the photographing means. Thus, in, e.g., a film photographing adapter for performing a closeup photographing operation, the light source has a luminance distribution for correcting a decrease in circumferential light amount in a photographing state, and a central portion can be prevented from being darkened in a negative-positive reversal mode.

It is the fifth object of the prebent invention to solve a problem in that when a camera for performing a photometric operation using an external photometric sensor is used in the above-mentioned photographing device for photographing an object such as a film, since a photometric optical system for measuring the luminance of an object is arranged independently of a photographing lens optical system, although no problem is posed when an object is located at a far distance, the photometric sensor cannot oppose an object region in a photographing operation at a close distance using a closeup lens, a photometric region is undesirably different from a photographing region, and a precise photometric operation cannot be performed.

In order to achieve the above object, according to still another preferred aspect of the present invention, there is disclosed a photographing device for photographing an object while holding a photographing unit at a closest distance to the object, comprising an object placing unit for holding the object within a photographing enable region of the lo photographing unit, support means for supporting the photographing unit at a predetermined closest distance from the object placing unit, and photometric region correction means, arranged between photometric means of the photographing unit and the object, for guiding a light amount on the photographing enable region to the photometric means of the photographing unit.

According to still another preferred aspect of the present invention, there is provided a photographing device for photographing an object while holding a photographing unit at a closest distance to the object, comprising an object placing unit for holding the object within a photographing enable region of the photographing unit, support means for supporting the photographing unit at a predetermined closest distance from the object placing unit, and photometric correction means, arranged between photometric means of the photographing unit and the object, for, when a light amount on the photographing enable region is guided to the photometric means of the photographing unit, correcting a light amount distribution within the photographing region.

With this arrangement, even when a closeup photographing operation such as a film photographing operation is performed using a camera of external photometric type, in which a photographing optical system and a photometric optical system are arranged independently of each other, the optical path of the photometric optical system can be corrected, so that a photometric region of a photometric sensor coincides with a photographing region. Therefore, a film photographing adapter, which can precisely perform a photometric operation, and allows a film photographing operation in combination with the camera, can be realized.

Since a light amount correction means for correcting nonuniformity of a luminance distribution on a photographing region caused by correcting the optical path of the photometric optical system is arranged, an erroneous operation of the photometric means caused by nonuniformity of brightness on the photographing region can be prevented, and natural, satisfactory exposure control can always be performed regardless of an object condition.

The above and other objects and features of the present invention will be apparent from the following detailed descriptions taken in conjunction with the accompanying drawings.

DETAILED DESCRIPTION OF THE PREFERRED EMBODIMENTS

A photographing device according to the present invention will be described below with reference to the accompanying drawings. In the following description, a system consisting of an SV camera, and a film adapter which enables a film photographing operation when the SV camera is attached to the adapter will be exemplified in detail below.

Figure 1:
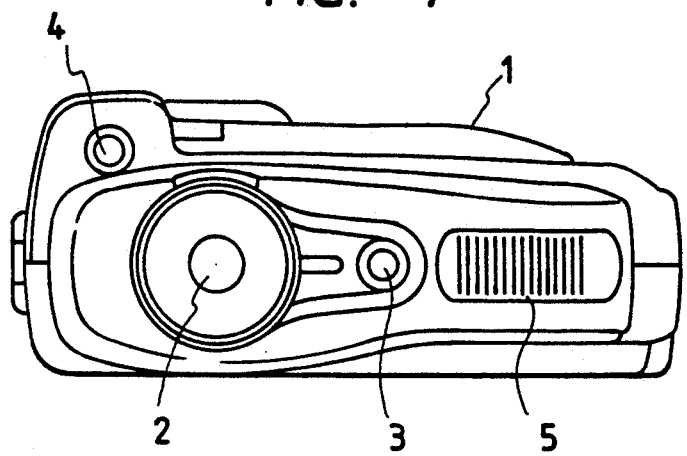
FIG. 1 is a front view for explaining an SV camera used in the present invention.
Figure 2:
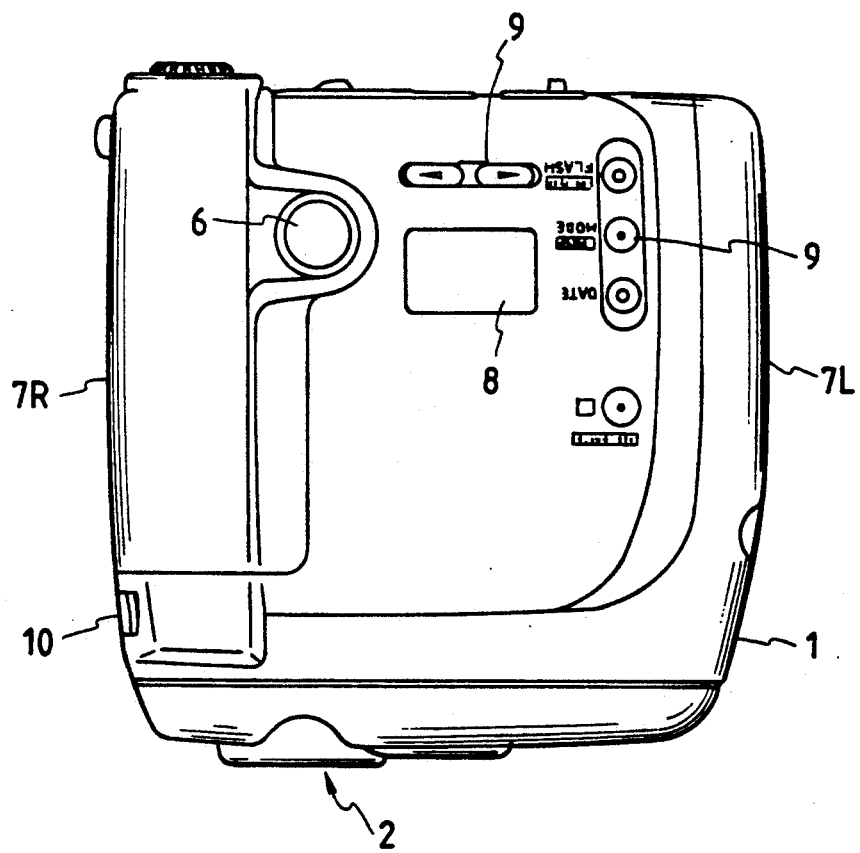
FIG. 2 is a top view for explaining the SV camera used in the present invention.

FIGS. 1 and 2 are respectively a front view and a top view showing the SV camera.

In FIGS. 1 and 2, an SV camera main body 1 (to be referred to as a camera main body hereinafter) photoelectrically converts a photographed image into an electrical signal using an image pickup element such as a CCD, then converts the electrical signal into a video signal, and records the video signal on concentric tracks on a magnetic disk, called a video floppy disk.

The camera comprises a photographing lens 2, a photometric sensor window 3 for performing exposure control by measuring brightness of an object, a finder optical system 4, a flash device emission window 5 for a flash device which appropriately and automatically emits light in accordance with the brightness of an object, a release button 6 arranged on the upper surface of the camera, right and left holding grips 7R and 7L, a display unit 8 for displaying various operation modes and control data of the camera, various operation switches 9 including a track feed switch, a camera mode selection switch, a flash switch, a date input switch, and the like, and a macro-photographing selection switch 10.

During a photographing operation, a user holds the right and left grips 7R and 7L of the camera, and operates the release switch 6 with a finger of his or her right hand holding the camera grip 7R, thereby performing a photographing operation.

As will be described in detail later, a negative-positive reversal circuit for performing a negative-positive reversal operation when photographed image data is recorded is arranged in the camera main body, and is controlled by a negative-positive selection switch of the film photographing adapter when the camera main body is coupled to the film 1o photographing adapter.

Figure 3:
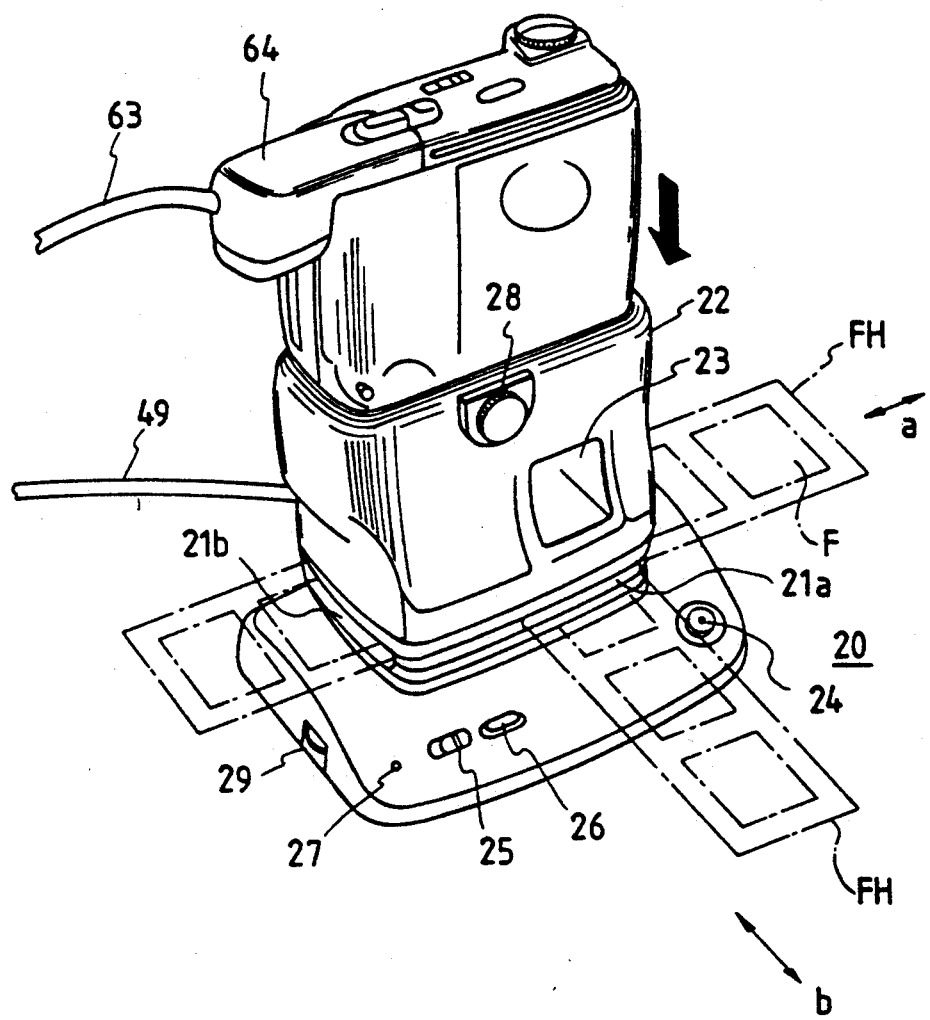
FIG. 3 is a perspective view showing a state wherein a camera is attached to a film photographing adapter according to the present invention.
Figure 4:
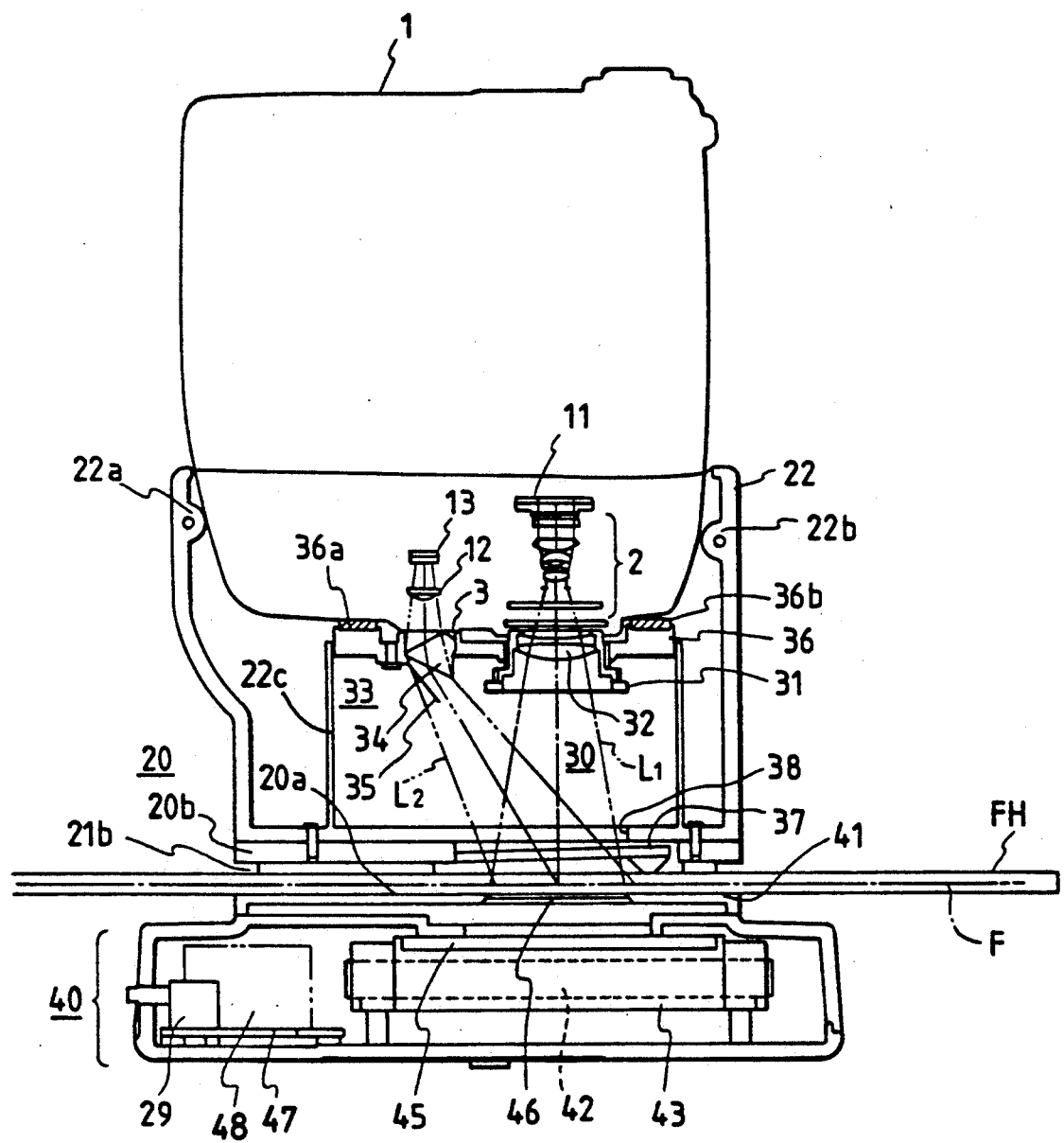
FIG. 4 is a front view for explaining an internal arrangement of the film adapter.
Figure 5A:
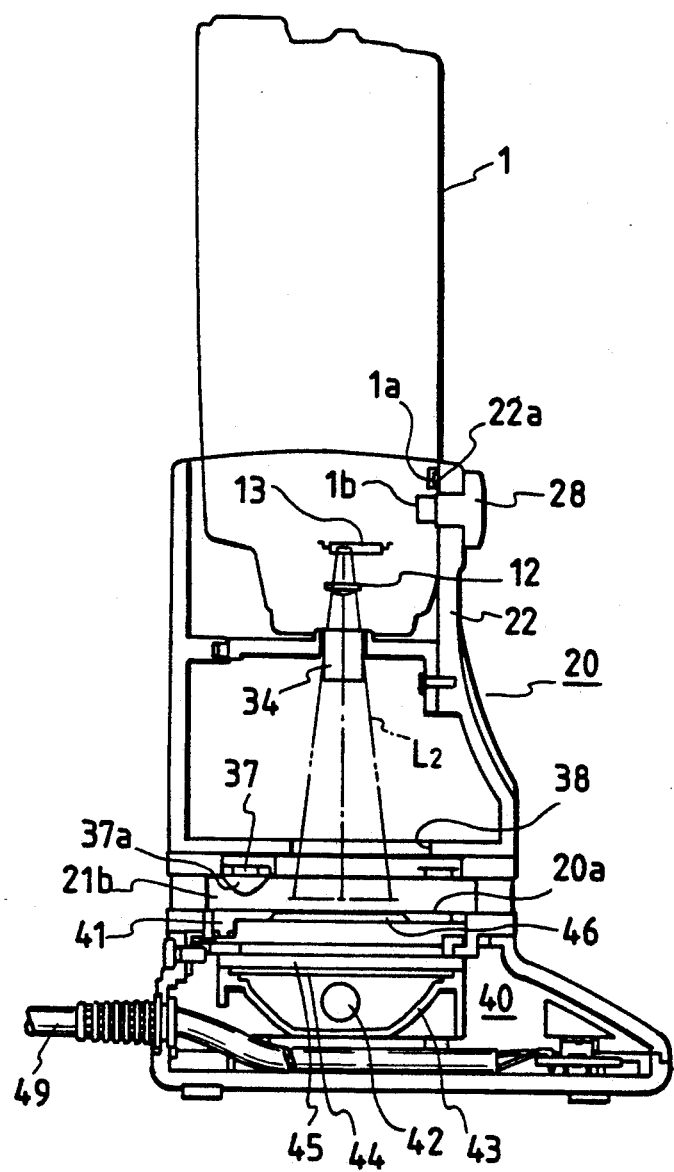
FIGS. 5A and 5B are side views for explaining an internal arrangement of the film adapter.
Figure 5B:
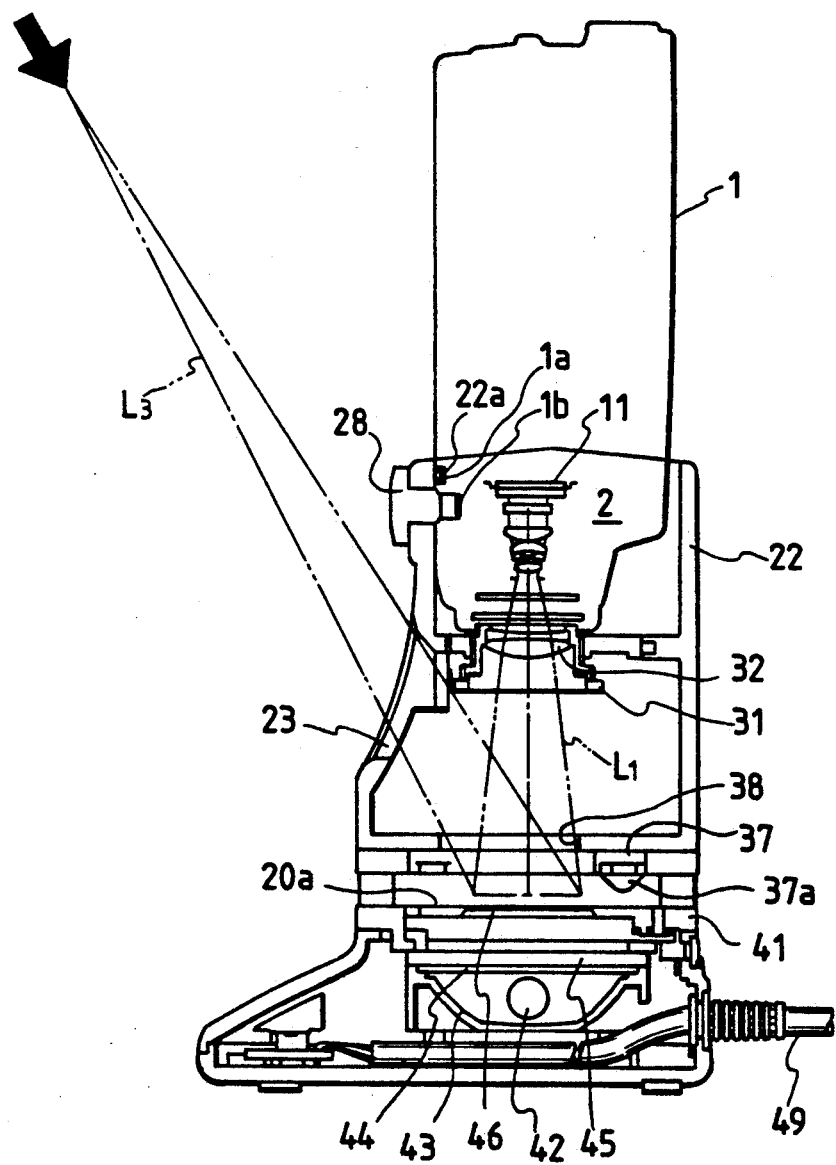

FIG. 3 is a perspective view showing a use state of the film photographing adapter according to the present invention, and FIGS. 4 to 5B are respectively a front view and side views for explaining an internal structure of film photographing adapter according to the present invention.

In FIG. 3, a film photographing adapter (or device) main body 20 has film insertion slits 21a and 21b for receiving a film F in the adapter. These film insertion slits are formed, so that the film can be inserted from two orthogonal directions, as indicated by arrows a and b in FIG. 3. A film placing surface 20a is formed to extend from these slits toward the interior of the adapter, and a photographing region is set at the crossing position of these extending portions.

The film F may be directly inserted from the film insertion slit. However, in order to protect the film, and to precisely align the film, the film is preferably handled while being stored in a film holder FH.

The reason why the film F can be inserted from the two orthogonal directions is as follows. That is, even when a film is subjected to a photographing operation at a normal lateral position or at a longitudinal position, the corresponding film frame can be recorded on a recording medium while holding the correct positional relationship according to the position of the camera in a photographing operation.

A camera holder 22 for holding the camera on the film photographing adapter 20 has an opening for mounting the camera in its upper portion. In addition, a space having the same pattern as the front portion of the camera main body is formed in the upper portion of the holder 22. When the camera is attached, the holder 22 can hold the camera main body, so that the photographing lens optical system 2 of the camera is precisely aligned to be at a predetermined closeup distance from a film surface. The camera holder also has a function of a light-shielding member for shielding a space between a film and the photographing lens optical system of the camera from external light, thereby preventing incidence of unnecessary external light when a film on the film placing surface is to be photographed.

The camera holder 22 has a fixing screw 28 for, when the camera is attached, fixing the camera at the attached position. In addition, an opening 23 for confirming a film is formed in the camera holder 22, so that a film located on the film placing surface can be directly, visually confirmed from outside the adapter.

As can be seen from the side sectional view of FIG. 5B, a film surface in the photographing region can be directly, visually confirmed by an optical path indicated by $L_3$ from the upper front side via the opening 23.

The reason why an arrangement for allowing direct, visual observation of a film located at the photographing position on the film placing surface via the opening 23 is adopted is as follows.

More specifically, in a state wherein the camera is attached to the film photographing adapter, the finder of the camera using an external finder optical system is offset from a film surface on the photographing region so as to align the photographing lens at a position precisely opposing a film. For this reason, at the closest distance like in a film photographing operation, the photographing region almost cannot be observed. Therefore, in order to observe the film placing surface using the finder of the camera, light on the photographing region must be introduced to the finder optical system using an optical path correction means by, e.g., refracting the light using a prism or by reflecting the light by mirrors.

However, when the optical path correction means comprising a prism is used, an optical path length until light reaches the finder is differed at the two ends of an object. The difference in optical path length does not pose a serious problem when an object is present at a far distance. However, at the closest distance (e.g., 10 cm or less) like in a film photographing operation, when an object is observed through the finder, a portion of the object cannot be focused. The finder magnification is also differed depending on positions in the photographing region, and as a result, a finder image is distorted.

In a method of using mirrors, at least two mirrors are required. In this method, one mirror must be arranged in front of the finder, and the other mirror must be arranged in front of the photographing lens. In this case, the mirror in front of the photographing lens must comprise a half mirror, or must be escaped outside the photographing region in a photographing operation, resulting in a complicated mechanism. Thus, this method is disadvantageous in terms of both the cost and space.

In order to solve these problems, according to the present invention, the opening 23 through which the film surface can be directly, visually observed is formed in the camera holder 22.

With this structure, since the finder of the camera need not be used, a possibility of touching the camera is reduced accordingly, and camera-shaking can also be prevented effectively. Furthermore, since the opening 23 and various operation switches of the film photographing adapter can be visually observed at the same time, erroneous operations can also be avoided.

The distance between the opening 23 and the film placing surface 20a for placing a film (to be described later) is determined to minimize the amount of light directly incident on the film F via the opening 23.

Thus, since no new optical system for guiding an object image to the finder need be added, and since the finder of the camera need not be used, a possibility of touching the camera is reduced accordingly, and camera-shaking can also be prevented effectively. Furthermore, since the opening and various operation switches of the film photographing adapter can be visually observed at the same time, erroneous operations can also be avoided.

Various operation switches are arranged on the front surface below the opening 23.

The adapter has a release switch 24, an erase switch 25 for canceling a photographed image, a negative-positive selection switch 26 for performing negative-positive selection in accordance with the type of film to be photographed, a display unit 27 such as an LED for displaying an operation state, and a power switch 29.

Electrical connections between the adapter and the camera main body will be described later. When the power switch 29 is turned on, a film photographing mode is automatically set, and a film image located on the photographing region is recorded upon operation of the release switch 24 of the film photographing adapter.

More specifically, when the camera is attached to the film photographing adapter, and necessary wiring lines are connected, the release switch of the camera is disabled, and a film image can be photographed using the release switch of the stable film photographing adapter without directly touching the camera. Therefore, a stable photographing operation free from camera-shaking can be performed.

When the erase switch 26 is operated in a so-called REC/REVIEW operation state for immediately reproducing a recorded image by the camera, the recorded image is erased. Thus, an operator can immediately reproduce a photographed image, can check its recording state, and can select whether or not the photographed image is canceled or is left as a recorded image.

The internal structure of the film photographing adapter will be explained below with reference to FIG. 4 and FIGS. 5A and 5B.

In FIGS. 4 to 5B, in the overall structure of the film photographing adapter 20, the camera holder 22 for holding the camera is arranged on the film placing surface 20a formed as extending portions of the film insertion slits 21a and 21b, and a transmission light source for illuminating the film from below is arranged under the film placing surface 20a.

The camera holder 22 is formed in a cylindrical shape according to the outer shape of the camera, so that the camera 1 is attached to the holder with its front surface facing down. Ridges 22a and 22b engaged with the side surfaces of the camera when the camera is attached with its front surface facing down, and engaging projections 22a which are engaged with engaging holes 1a formed in the bottom surface of the camera so as to align the camera are formed in the camera holder 22. Upon engagement of these members, the camera main body 1 is aligned, and the fixing screw 28 is screwed in a screw hole 1b of the camera, thereby fixing the camera at that position.

An image pickup element 11 such as a CCD for photoelectrically converting a focused image, and outputting an image pickup signal is arranged behind the photographing lens optical system in the camera. A photometric lens 12 focuses light incident from the photometric sensor window 3 onto a photometric sensor (SPC) 13.

In the camera holder 22, a closeup optical system 30 comprising a closeup lens 32 mounted on a lens barrel 31 is supported at a position opposing the photographing lens optical system 2 of the camera via a support member 36, and a photometric correction optical system 33 comprising a prism 34 for performing optical path correction so as to introduce light on the photographing region into the photometric sensor window 3, and a photometric correction member 35 for correcting a photometric light amount distribution is also supported at a position opposing the photometric sensor window 3 via the support member 36. An inner side wall 22c of the camera holder 22 closes a space including the closeup optical system 30 and the photometric correction optical system 33, thereby defining an optical chamber. Details of the support member 36 will be described below.

Elastic members 36a and 36b, formed of, e.g., rubber, are arranged on the upper surface of the support member 36, which surface opposes the front surface of the camera. The elastic members temporarily align the camera to be attached to the camera holder 22 at a position where the fixing screw 28 near the attaching position can be threadably engaged. The elastic members also serve as shock absorbing members when the camera is attached.

A film is often subjected to photographing operations at both lateral and longitudinal positions. When such film images are photographed, and the photographed images are displayed on, e.g., a TV monitor display, the TV monitor screen corresponds to an image photographed at the lateral position. When an image photographed at the longitudinal position is to be photographed, a film must be rotated through 90°. However, when a table for placing a film or a member which holds a film is arranged to have a rotatable structure, this structure makes the apparatus bulky, and leads to an increase in cost. Since the number of movable components is increased, the positional precision between a photographing lens and a film surface is adversely influenced.

The impaired positional precision causes an out-of-focus state especially in a closeup photographing operation with a shallow field depth.

Therefore, in the present invention, a film can be inserted in both the lateral and longitudinal directions to the film photographing position in the film photographing adapter. In addition, a means for pressing the film against the film placing surface to regulate the position of the film can always perform an aligning operation at the same position regardless of the film insertion direction without disturbing a photographing operation.

Film pressing members 37 are arranged on a surface, opposing the film placing surface, of an upper plate 20b of the film photographing adapter 20 near an opening 38. The film pressing members align the film F or the film holder FH inserted from the film insertion slit 21a or 21b in units of frames, and elastically press the film against the film placing surface to prevent floating of the film and to maintain a predetermined photographing distance.

The film pressing members 37 are leaf-spring-like elastic members which are integrally molded upon molding of the upper plate 20b of the adapter. A substantially conical engaging projection 37a is formed on a portion of each member 37, which portion is in contact with the film or the film holder, so that film insertion will not be disturbed.

Figure 12:
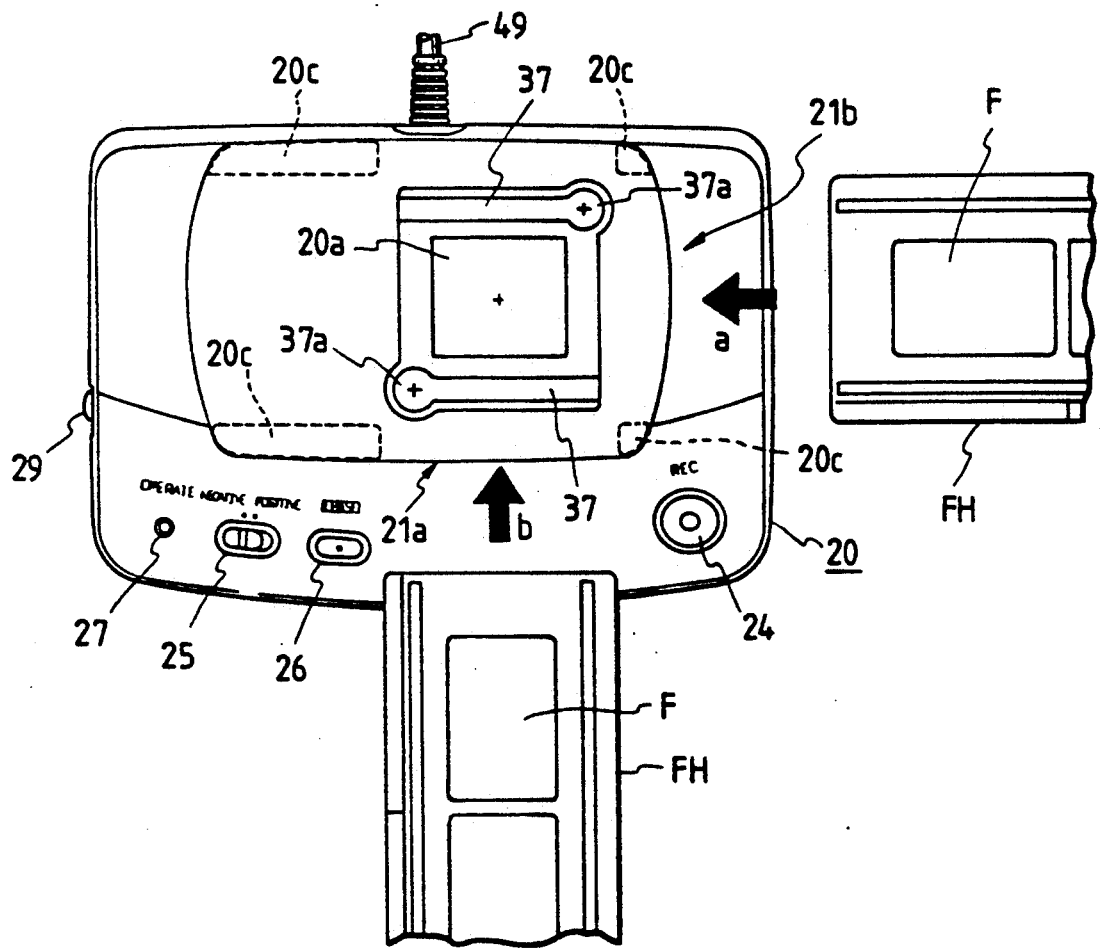
FIG. 12 is a top view for explaining a film positioning mechanism of the film adapter.

As can be especially seen from FIG. 12 which shows the photographing region from the camera insertion direction, two film pressing positions are set on the diagonal line of the photographing region to fall outside a photographing range of the film. Therefore, when a longitudinally photographed film or a laterally photographed film is inserted, i.e., when a film is inserted from a direction corresponding to the direction of an image, the film pressing members 37 can press and align the film at two points falling outside the photographing range without damaging a film frame. as a result, a film pressing effect can be obtained by a minimum number of pressing points.

A film can be inserted in both the lateral and longitudinal directions to the film photographing position in the film photographing adapter. In addition, a means for pressing the film against the film placing surface to regulate the position of the film can always perform an aligning operation at the same position regardless of the film insertion direction without disturbing a photographing operation. Therefore, the structure can be simplified, and both films at longitudinal and lateral positions can be satisfactorily photographed without causing a position shift.

In FIG. 12, guide members 20c regulate a moving path of the film holder FH inserted from one of two directions indicated by the arrows a and b.

A transmission illumination unit 40 for illuminating a film from below is arranged below the film placing surface of the film photographing adapter 20.

In FIG. 4 and FIGS. 5A and 5B, the film photographing adapter 20 also includes a film table 41 forming the film placing surface 20a, a fluorescent lamp 42 as a light source, a box-like reflection plate 43 for reflecting light emitted from the fluorescent lamp and focusing the reflected light onto a film arranged thereabove, a correction sheet 44 for correcting and uniforming the luminance distribution of light emitted from the light source, i.e., the fluorescent lamp 42, and a diffusion plate 45 for diffusing light emitted from the light source. Light emitted from the light source and uniformed by these components illuminates a film from below via an opening 46 on the film placing surface, and the light transmitted through the film is incident in the photographing lens 2 of the camera main body 1 via the closeup lens 32.

The film photographing adapter also comprises a circuit board 47 on which an electrical circuit of the film photographing adapter is formed, an inverter circuit 48 for turning on the fluorescent lamp 42, and a cable 49 to be connected to an external connection device. The fluorescent lamp is turned on/off by a power switch 29 (to be described later).

The function of the correction sheet 44 will be described below.

In general, a phenomenon of a decrease in circumferential light amount of a lens is known.

Figure 6A:
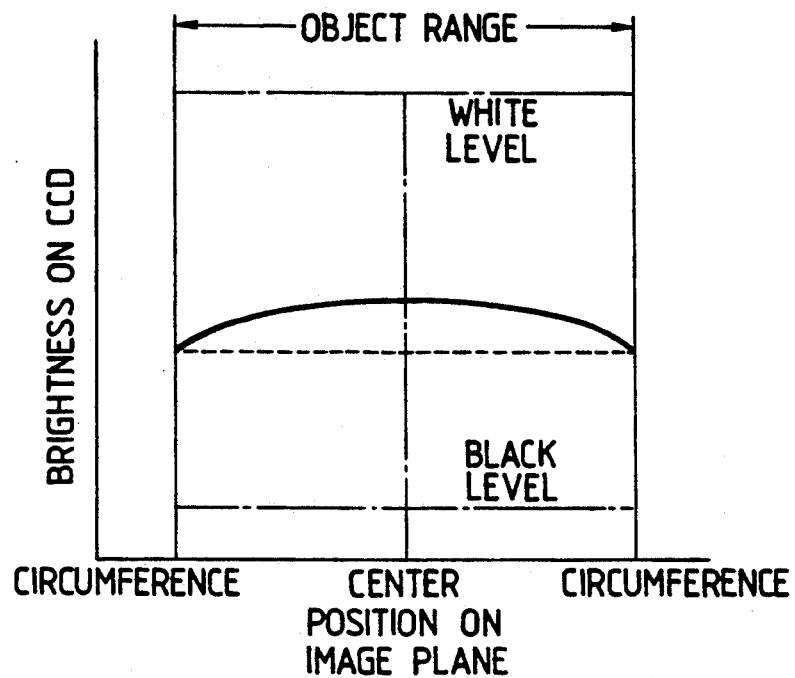
FIG. 6A is a graph for comparing characteristics before and after correction of a luminance distribution of a light source of the film adapter.
Figure 6B:
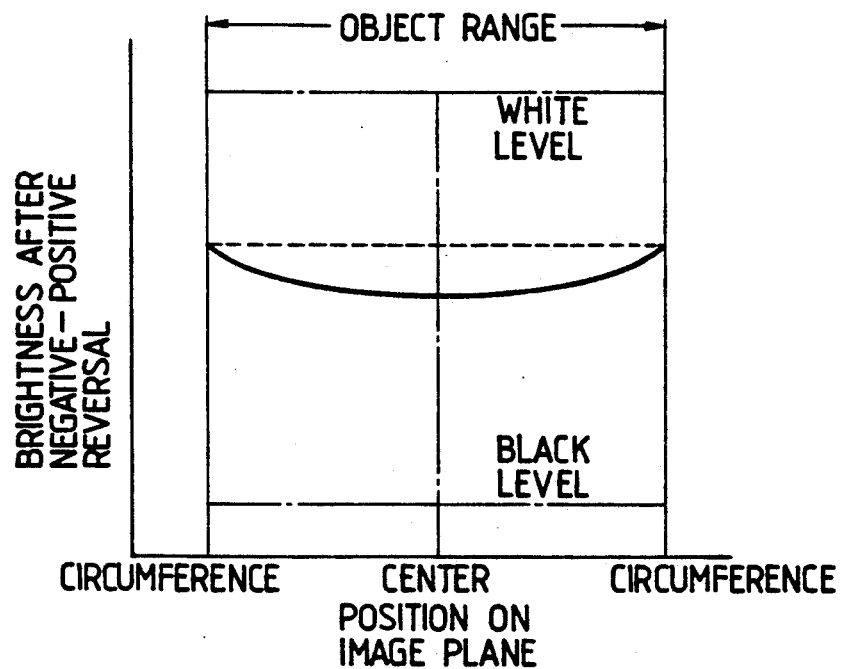
FIG. 6B is a graph for comparing characteristics before and after correction of the luminance distribution of the light source of the film adapter after negative-positive reversal operation.

This means that, when an object having a uniform luminance distribution is photographed, a circumferential portion of a photographed image becomes dark (indicated by a solid curve in FIG. 6A). Although such a dark portion is not normally conspicuous, when the photographed image is subjected to a negative-positive reversal operation, the central portion of the reversed image is darkened, resulting in an undesirable image (indicated by a solid curve in FIG. 6B).

Figure 7:
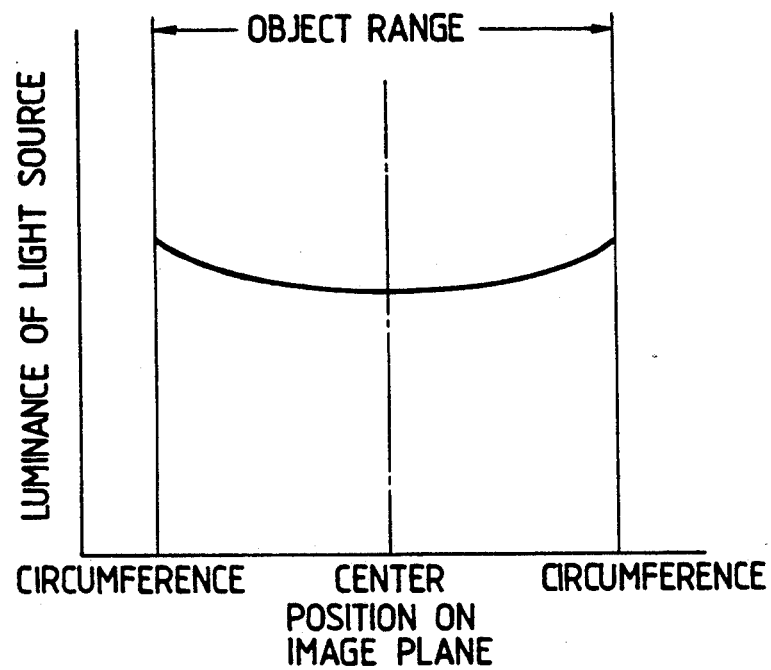
FIG. 7 is a graph showing a transmission light amount distribution of a correction sheet.
Figure 8:
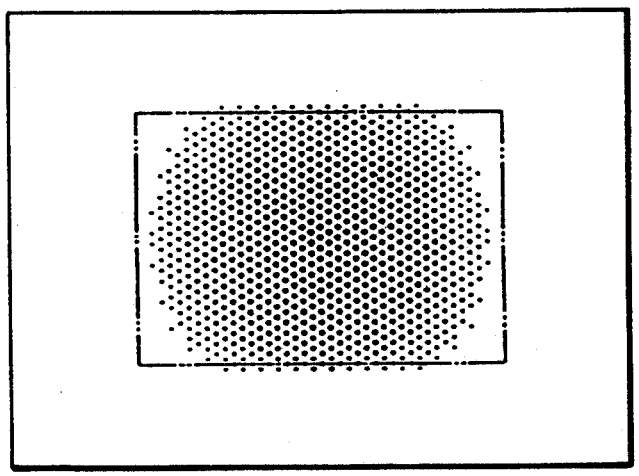
FIG. 8 is a view showing an arrangement of the correction sheet.

The correction sheet is used for correcting a decrease in circumferential light amount caused by a lens so as to obtain a uniform luminance distribution. As shown in FIG. 8, the correction sheet is formed of a transparent or semitransparent sheet or a glass plate, and for example, a dot pattern is formed, so that the transmission light amount of a central portion surrounded by an alternate long and two short dashed line in FIG. 8 is decreased as compared to that of a circumferential portion, thereby correcting the light amount distribution. FIG. 7 shows the luminance distribution of light transmitted through the correction sheet. As can be seen from FIG. 7, the luminance of the central portion is suppressed as compared to that of the circumferential portion.

Therefore, when the fluorescent lamp 42 as the light source is turned on in a state wherein the correction sheet is inserted in an optical path, light emitted from the fluorescent lamp 42 is radiated on the film F via the correction sheet 44, the diffusion plate 45, and the opening 46.

If a light source is photographed while no film F is present on the film placing surface, the brightness on the image pickup surface of the image pickup element 11 presents a uniform luminance distribution, as indicated by a broken line in FIG. 6A since the decrease in circumferential light amount of the lens is corrected by the correction sheet. When the photographed image is subjected to a negative-positive reversal operation, a uniform luminance distribution can also be presented, as indicated by a broken line in FIG. 6B.

In this manner, photographing light is uniformed on the film surface, and when a photographed image is subjected to a negative-positive reversal operation, the central portion of an image can be avoided from being darkened due to a decrease in circumferential light amount of the lens to provide a poor-quality image.

According to this embodiment, the decrease in circumferential light amount of the lens, and the luminance distribution of the light source itself upon a photographing operation by the film photographing adapter are corrected at the same time. However, in practice, a film image also suffers from a decrease in circumferential light amount upon photographing. Therefore, when the luminance distribution of the light source is corrected in consideration of the decrease in light amount, a better image can be obtained.

In this embodiment, the correction sheet is arranged in the light source unit. However, the correction sheet may be arranged anywhere in a photographing optical path extending between the light source and the image pickup element 11. In this case, positions immediately before and after the film and a position immediately before the image pickup element should be avoided since the pattern of the correction sheet becomes conspicuous.

This embodiment employs the correction sheet which corrects the luminance distribution by the dot pattern. However, the present invention is not limited to this as long as the light amount distribution can be corrected. For example, an ND (neutral density) filter may be used.

The film photographing adapter of the present invention has the arrangement as described above. The functions of the closeup photographing optical system and the photometric optical system will be explained hereinafter.

An image obtained by photographing a film image in the photographing region is incident on the photographing lens 2 of the camera along an optical path indicated by $L_1$ in FIG. 4 via the opening 38 in the bottom surface of the camera holder 22, and the closeup lens 32, and is then guided to the image pickup element 11, thus enabling a closeup operation of the film image.

On the other hand, the film image is subjected to optical path correction by the optical path correction prism 34, and is guided to the photometric sensor window 3 along an optical path indicated by $L_2$ in FIG. 4. The film image is then focused via the photometric lens 12, and is incident on the photometric sensor (SPC) 13. Thus, the photometric operation of the photographing region is enabled.

Actual data will be presented below. In this embodiment, the distance between the closeup lens and a film is set to be about 36 mm, and the distance between the optical axis of the photographing lens 2 and the photometric lens 12 is about 28 mm. In this case, in view of light on the film photographing region to be incident on the photometric sensor 13, as can be apparent from FIG. 4, the optical path length from the center of the film surface on the photographing region is different from the optical path lengths from the right and left edges of the film surface. In this embodiment, as a result of calculations based on the above distance data, the optical path length from the left edge is shorter than the optical path length from the center by about 10%, and contrarily, the optical path length from the right edge is longer than the optical path length from the center by about 10%. Since the brightness (illuminance) of light is inversely proportional to the square of a distance, the brightness of light at the left edge of the photometric sensor (SPC) 13 is stronger than that of the central portion by about 20%, and the brightness of light at the right edge of the photometric sensor (SPC) 13 is weaker than that of the central portion by about 20%.

Figure 9A:
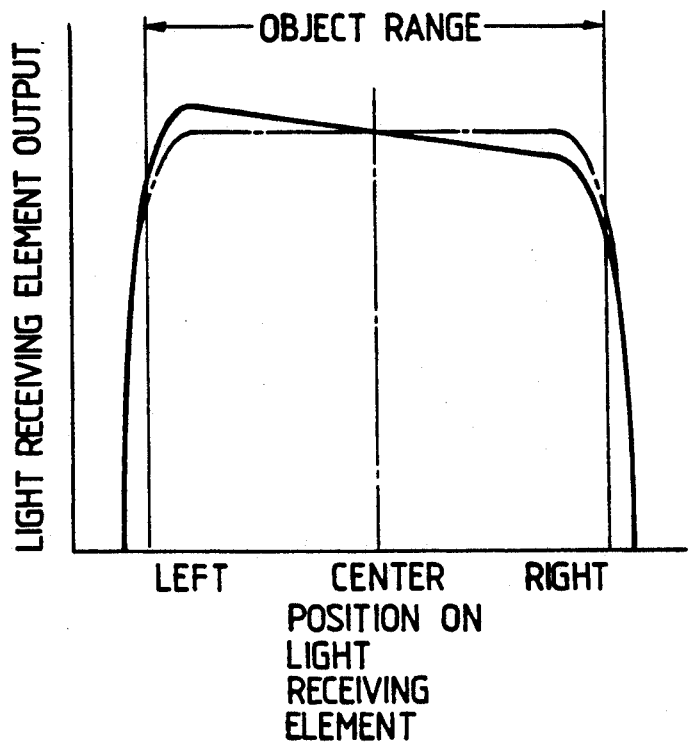
FIGS. 9A and 9B are graphs showing photometric sensitivity of a light amount correction member in a photometric optical system of the film adapter.
Figure 9B:
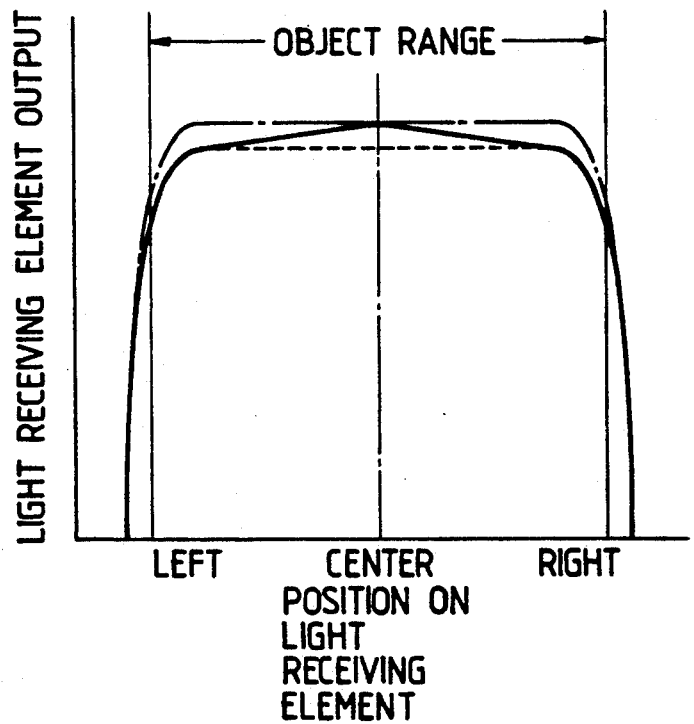

FIGS. 9A and 9B show the relationship between the position on the film frame, and its luminance level, i.e., an output voltage from the photometric sensor.

As a result, when an object, i.e., a film image has a uniform luminance, the output voltage from the photometric sensor 13 must become one indicated by an alternate long and short dashed curve in FIG. 9A, but actually becomes strong on the left side and weak on the right side, as indicated by a solid curve.

In this state, when the left side of a film frame is bright, a brightness higher than the actual brightness is sensed, and the brightness of a photographed frame is suppressed, resulting in a dark image as a whole. On the contrary, when a film image which has a bright portion on the right side of the frame is photographed, a brightness lower than the actual brightness is sensed, and a photographed frame is overexposed, resulting in a whitish image as a whole. Therefore, when a film image has nonuniform right and left brightness distributions, the overall exposure is undesirably disturbed.

In order to correct any difference between right and left photometric sensitivities, the light amount (photometric) correction member 35 for limiting left light components which have a short optical path length and are detected to be brighter is arranged for a film frame image to be incident on the optical path correction prism 34.

Thus, the left portion of a film image can be prevented from being emphasized, and the luminance distribution on a frame, i.e., a photometric sensor output when a uniform luminance surface is subjected to a photometric operation, can become one indicated by a solid curve shown in FIG. 9B. In this state, the central portion is sensed to be brighter than the right and left portions. However, any difference between right and left light amounts can be eliminated, and a frame image can become natural.

The light amount correction member 35 is a rectangular plate member for shielding light. The light amount correction member 35 may comprise a light transmission member, as needed, and delicate light amount correction can be attained by changing the transmittance of the member 35.

The light amount correction member 35 limits light components on the left side of the photographing region having a short optical path length, thereby obtaining symmetrical photometric sensitivity characteristics on the right and left sides. However, light on the overall photographing region may be limited to obtain uniform photometric sensitivity characteristics.

Figure 10:
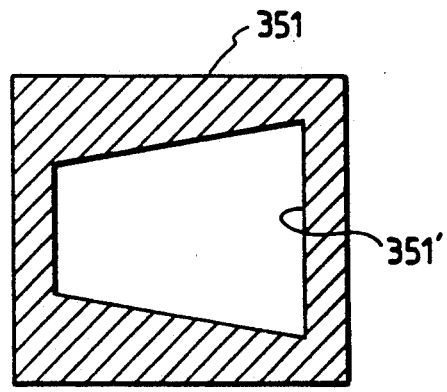
FIG. 10 is a view showing another example of the light amount correction member in the photometric optical system of the film adapter.

FIG. 10 shows this example, i.e., a light amount correction member 35 arranged between the prism 34 and the photometric lens 12 in place of the light amount correction member 35 in FIG. 4. An opening 351' whose width is gradually decreased from the right side toward the left side is formed in the member 351. When this member is used, the light amount on the left side is suppressed, and the same photometric sensitivity characteristics as those obtained by the light amount correction member 35 shown in FIG. 4 can be obtained, as indicated by a broken curve in FIG. 9B.

Figure 11:
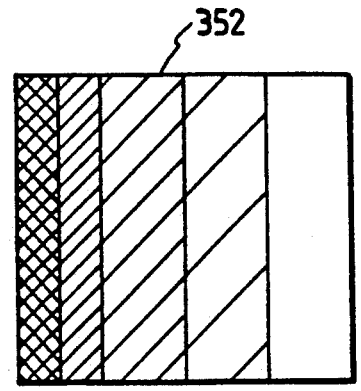
FIG. 11 is a view showing still another example of the light amount correction member in the photometric optical system of the film adapter.

Furthermore, as shown in FIG. 11, a light amount correction member 352 whose transmittance is decreased from the right side toward the left side may be used to obtain the same effect as described above.

In this manner, according to the film photographing adapter of the present invention, when a closest distance photographing operation such as a film photographing operation is performed using even an external photometric camera in which the photographing lens optical system and the photometric optical system are separately arranged, the optical path of the photometric optical system is corrected, so that a photometric region of the photometric sensor coincides with the photographing region. Therefore, if the photometric sensor is independent from the photographing lens optical system, a precise photometric operation can be performed.

The light amount correction means for correcting a nonuniform luminance distribution on the photographing region caused by correcting the optical path of the photometric optical system is arranged. Therefore, the film photographing adapter, for enabling a film photographing operation upon coupling with a camera, which can prevent an erroneous operation of the photometric means caused by nonuniform brightness on the photographing region, and can satisfactorily perform natural exposure control regardless of an object condition, can be realized by a simple arrangement.

The system arrangement including electrical connections between the camera main body and the film photographing adapter, and other devices to be connected will be described below.

Figure 13:
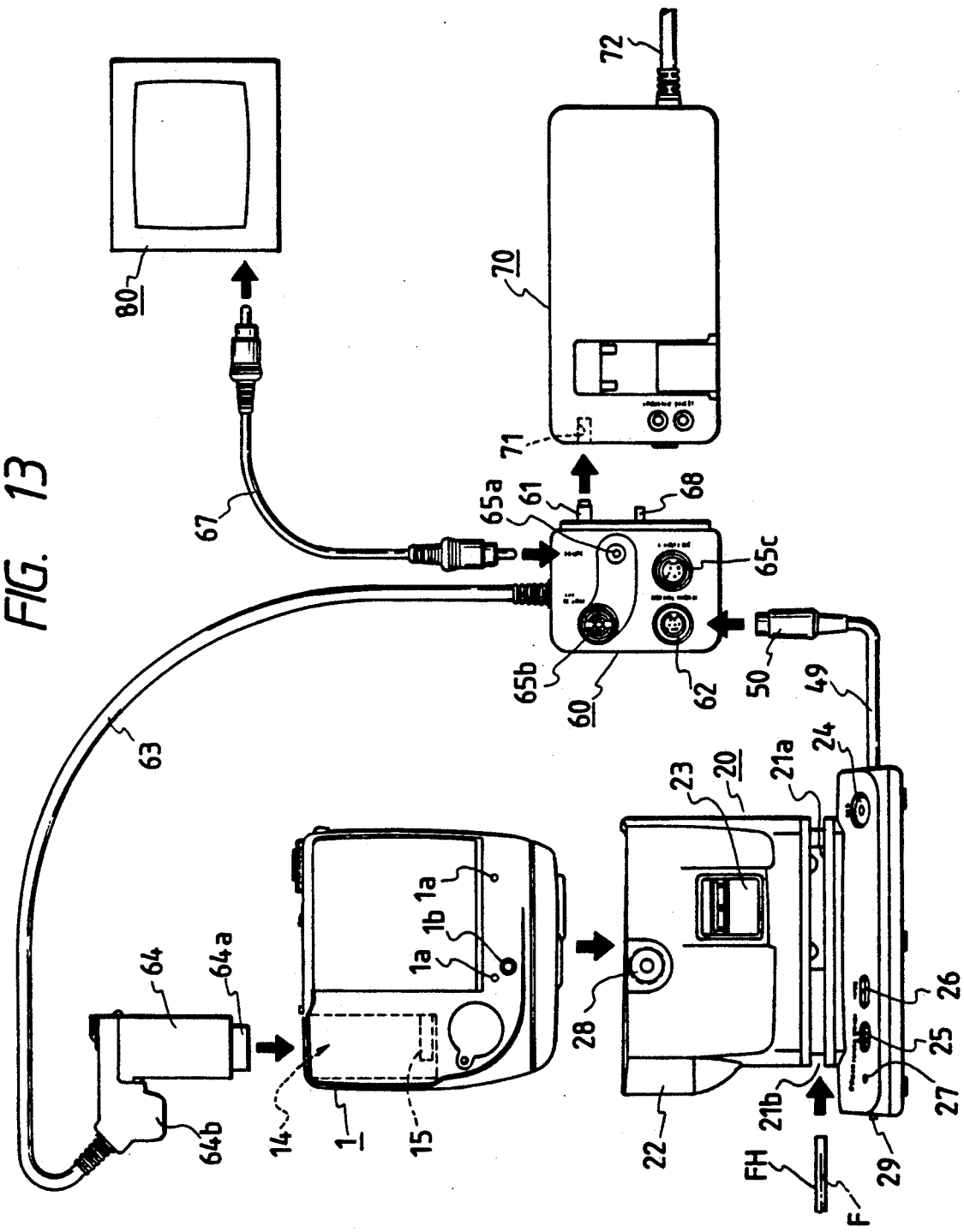
FIG. 13 is a view of a system arrangement showing a state wherein the camera and the film adapter according to the present invention are connected.

FIG. 13 shows the system arrangement of the camera and the film photographing adapter according to the present invention.

The system shown in FIG. 13 includes the camera main body 1, and the film photographing adapter 20 for performing a film photographing operation upon coupling with the camera main body, as described above.

The system also includes an AC power source adapter 70 for converting an AC power source voltage supplied from a commercial power source (not shown) via a cable 72 into a DC power source voltage for driving this system, and supplying the DC power source voltage, a monitor display 80 for monitoring an image photographed by the camera, and a control coupler (interface adapter) 60 serving as an interface for performing connections, relays, and control among the camera 1, the film photographing adapter 20, the AC power source adapter 70, and the monitor display 80.

The control coupler 60 is fixed to the AC power source adapter 70 by a fixing screw 68, and is electrically connected thereto via power source connectors 61 and 71. Thus, the control adapter serves as a power source interface of the system.

The control coupler 60 is connected to a connector 50 at the distal end of a cable 49 extending from the film photographing adapter 20 via a connector 62, and its camera control cable 63 is connected to the camera main body 1, thereby performing power supply to the camera main body 1 and the film photographing adapter 20, input/output operations of control signals to/from the camera main body 1 and the film photographing adapter 20, and reception of image signals output from a photographing system of the camera main body 1 or reproduced from a video floppy disk.

In this case, the control coupler 60 is connected to the camera using a battery case 14.

More specifically, a battery attachment 64 is attached to the battery case 14 to complete a connection with the camera. The battery attachment 64 has the same shape as a battery of the camera, has power source contacts (not shown) at the same positions as those of the battery, and has a connector 64a to be connected to a signal input/output connector 15 arranged in the battery case.

The camera 1 has the negative-positive reversal circuit. The operation of this circuit is controlled by the film photographing adapter, as will be described later.

Thus, power supply is attained via a power source line in the cable 63, and camera control is performed according to operations of the release switch 24, the negative-positive selection switch 25, the erase switch 26, and the power switch 29 of the film photographing adapter 20 using control signal lines in the cable 63 and control signal terminals of the connectors 64a and 15. Furthermore, an image signal photographed by the camera can be controlled, and the image signal can be received from the camera main body using image signal lines in the cable 63 and image signal output terminals of the connectors 64a and 15.

The control coupler 60 is connected to the monitor display 80 via a cable 67, and can transfer an image signal output from the camera main body to the monitor display 80, thereby reproducing the image signal. Note that the control coupler has video output terminals 65a, 65b, and 65c corresponding to the types of monitor display to be connected.

The battery attachment 64 also has a remote-control light receiving unit 64b. When the battery attachment 64 is attached to the camera 1 which is not mounted on the photographing adapter 20, the camera 1 can be operated by an external remote controller (not shown).

The circuit arrangement of the above-mentioned system will be described below with reference to the block diagram shown in FIG. 14.

Figure 14:
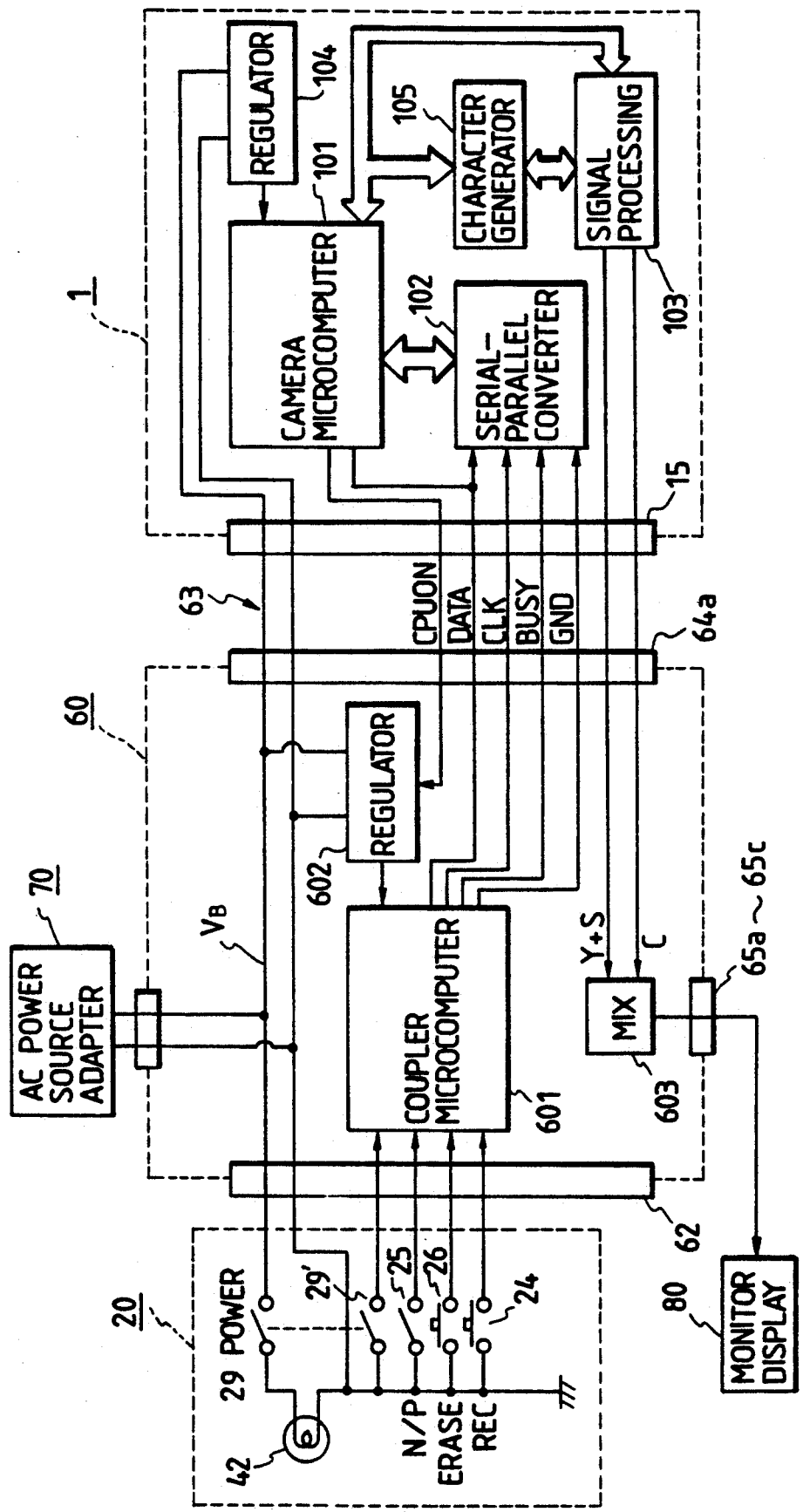
FIG. 14 is a block diagram showing a circuit arrangement in the system shown in FIG. 13.

FIG. 14 illustrates circuit blocks of the camera main body 1, the film photographing adapter 20, the control coupler 60, the AC power source adapter 70, and the monitor display 80.

The camera main body 1 comprises a microcomputer (to be referred to as a camera microcomputer hereinafter) 101 constituting a control system control circuit, a serial-parallel converter 102 for converting various communication data sent from a control microcomputer (to be referred to as a coupler microcomputer hereinafter) 601 in the control coupler 60 (to be described later) via serial communications into parallel data, and supplying the parallel data to the camera microcomputer 101 to perform data communications, and a signal processing block 103 for performing various processing operations such as a photographing operation by the image pickup element 11, a camera process operation, an image recording operation onto the recording medium, a negative-positive reversal operation upon recording, reproduction of an image recorded on the recording medium, and the like. A photographed signal output from the photographing system is converted into a standardized video signal via the camera process, and is recorded on or reproduced from the video floppy disk (not shown). The video signal is output from the camera as Y+S and C signals.

The camera main body 1 also comprises a regulator 104 for supplying a stable voltage to the camera microcomputer 101 and the signal processing block 103, and a character generator 105 for causing the monitor display 80 to display character data representing various control data.

The film photographing adapter 20 includes the release switch 24, the negative-positive selection switch 25, the erase switch 26, the power switch 29 and a switch 29' which is interlocked with an ON/OFF operation of the power switch 29 and supplies a power source state, i.e., an ON (or OFF) state of the light source to the coupler microcomputer 601 in the control coupler, and the light source 42 comprising the fluorescent lamp. The adapter 20 is connected to the control coupler 60 via the cable 49.

In the control coupler 60, a DC power source voltage is supplied from the AC power source adapter 70 to a power source line $V_B$, and is then supplied to respective circuits including the light source 42 in the film photographing adapter 20 via the power source line $V_B$. In addition, the power source voltage is supplied to the regulator 104 in the camera main body 1 via the cable 63.

The control coupler 60 includes the coupler microcomputer 601 for performing control communications with the camera microcomputer 101 in the camera main body 1 via the cable 63 on the basis of signals representing operation states of various switches received from the film photographing adapter 20, a regulator 602 for stabilizing a voltage supplied from the power source line $V_B$, and supplying the stable voltage to the coupler microcomputer 601, and a mixing circuit 603 for adding a video signal consisting of Y+S and C signals sent from the camera main body 1 via the cable 63, and outputting the sum signal to the monitor display 80.

The regulator 602 is controlled by a control signal CPUON from the camera microcomputer 101. When the signal CPUON goes to LOW level, the regulator 602 is enabled, thus causing the coupler microcomputer 601 to start its operation.

The camera microcomputer 101 and the coupler microcomputer 601 are connected via signal lines for the above-mentioned signal CPUON, various data signals, a clock signal, a BUSY signal, and a GND (ground) line.

The camera system according to the present invention has the above-mentioned arrangement. In an actual use, the control coupler 60 is connected to the AC power source adapter 70, and is fixed thereto by the screw 68. The control coupler 60 is then connected to the camera main body 1 via the battery attachment 64 of the cable 63. Furthermore, the control coupler 60 is connected to the film photographing adapter 20 via the cable 49, and one of its video output terminals 65a to 65c is connected to the monitor display 80 via the cable 67. Thus, the connections shown in FIGS. 13 and 14 are achieved, and a power supply voltage can be supplied to the camera main body 1 and the film photographing adapter 20.

The operation states of the various operation switches of the film photographing adapter 20 are transmitted to the coupler microcomputer 601 in the control coupler 60. When the power switch 29 in the film photographing adapter 20 is turned on, the operation state is supplied to the coupler microcomputer 601 via the interlocked switch 29'. The camera microcomputer 101 is then controlled upon an instruction from the coupler microcomputer 601. In this manner, a film photographing mode is set. In this mode, the camera microcomputer 101 is controlled upon operation of the film photographing adapter 20. More specifically, the film photographing mode is set according to an ON operation of the power source (i.e., the light source) of the film photographing adapter 20.

In this state, the operation of the film photographing adapter 20 is preferentially accepted, and when the power switch 29 of the film photographing adapter is turned off, control is made to disable the recording operation of the camera. When the power switch of the film photographing adapter 20 is turned on to turn on the light source 42, a film photographing operation using the camera is allowed.

In accordance with the photographing state of a film, the film or the film holder is inserted from the film insertion slit 21a or 21b of the film photographing adapter 20, and a desired film frame is moved to the photographing region on the film placing surface while a film surface is visually observed via the opening 23 of the camera holder 22. Thereafter, the release switch 24 is depressed to perform a film photographing operation.

When the camera main body 1 and the film photographing adapter 20 are connected as described above, the camera is automatically set in the film photographing mode, and the release switch 6 of the camera is disabled. The reason for this is as described above.

When the release switch 24 of the film photographing adapter is turned on to perform a photographing operation, if the negative-positive selection switch 25 of the film photographing adapter 20 is switched to a positive position, the camera directly records an image. If the switch 25 is switched to a negative position, the negative-positive reversal circuit arranged in the signal processing block 103 in the camera is operated to perform a negative-positive reversal operation of the image, and the reversed image is recorded on the video floppy disk.

When the recording operation is performed, the presently recorded image data is reproduced on the screen of the monitor display 80 (a so-called REC/REVIEW mode). When the erase switch of the film photographing adapter 20 is turned on in this operation state, the camera microcomputer 101 of the camera is controlled in accordance with the operation of the erase switch, thereby erasing the recorded image.

Therefore, when a wrong image is recorded, or a recording state is not good, an operator can erase the recorded image from the video floppy disk, and restart recording.

As described above, when the camera is attached to the film photographing adapter, the film photographing mode is automatically selected, and the camera can be controlled by the film photographing adapter. Thus, a film photographing operation can be easily performed without using a special-purpose apparatus, and a recorded image can be recorded on the video floppy disk, edited, and displayed on the monitor.

Figure 15:
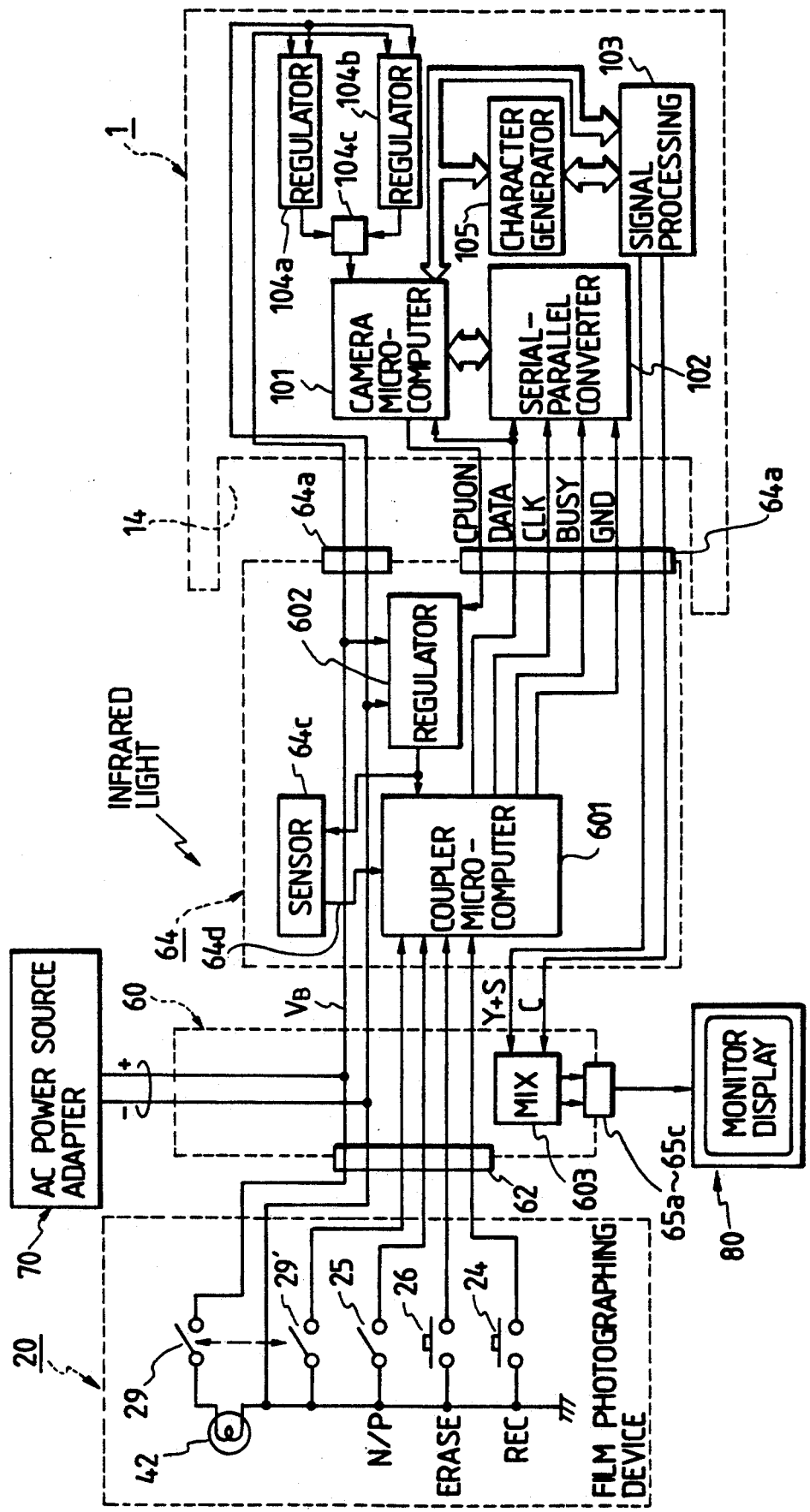
FIG. 15 is a block diagram showing a circuit arrangement of a photographing device according to another embodiment of the present invention.

FIG. 15 shows another embodiment of the present invention. In the system diagram of FIG. 13, a battery attachment 64 comprises a remote-control light-receiving unit 64b, and a coupler microcomputer for relaying various control data between a camera 1 and a film photographing adapter 20 is arranged not in a control coupler 60 but in the battery attachment 64. Note that the same reference numerals denote components having the same functions as those shown in FIG. 13, and a description of their arrangements and operations will be omitted.

As can be seen from FIG. 15, in this embodiment, the remote-control light-receiving unit 64b is provided to the battery attachment 64, and the coupler microcomputer 601 is arranged in the battery attachment 64. Control data from a remote controller is processed by the coupler microcomputer, and the processed data is supplied to a camera microcomputer.

An operation in this embodiment will be described below.

Output signals from switches 24 to 29' of the film photographing adapter 20 are supplied to the control coupler 60 via a connection cable 49, and are then supplied to the microcomputer 601 in the battery attachment 64.

Note that an ON detection signal output from the ON detection switch 29' interlocked with the power switch 29 indicates that a fluorescent lamp 42 of the film photographing adapter 20 is turned on. In response to this signal, the operation of the camera 1 by operation buttons of the camera main body 1 is controlled, as described above.

The power source line is connected to an AC power source adapter 70 via the control coupler 60, and a predetermined DC power source voltage is supplied from the AC power source adapter 70 via the power source line.

This power source line is connected to the camera main body 1 via the battery attachment 64, and also supplies a power source voltage to the camera main body 1.

The battery attachment 64 comprises a sensor 64c for receiving infrared light emitted from an external infrared wireless remote controller (not shown) and modulated based on a predetermined code, the microcomputer 601 for demodulating the code from a detection output from the sensor 64c, and outputting control data according to output signals from the film photographing adapter, and a regulator 602 for supplying a power source voltage to the microcomputer. The regulator 602 is controlled by a control signal CPUON supplied from the camera main body 1 via a communication line.

When the control signal CPUON goes to LOW level, the regulator 602 is enabled, thus causing the microcomputer 601 to start its operation.

In FIG. 15, a light-receiving sensor output 64d is detected by the microcomputer 601, thereby identifying a code from the external remote controller.

More specifically, the microcomputer 601 detects the detection output from the sensor 64c, and identifies a code therefrom. The microcomputer then transmits control data based on the identified code to the camera main body 1 via a serial communication line.

In this embodiment, codes which can be identified by the microcomputer 601 include all the codes which correspond to various data input functions such as a photographing function, a reproduction function, a date, and the like, and can be operated by the external remote controller.

The camera main body 1 comprises a microcomputer 101 for controlling an operation of the camera 1 in accordance with a control signal supplied from the battery attachment 64 in correspondence with operations of operation buttons 6 and 10 provided to the camera main body or an output signal from the film photographing adapter 20, an S/P (serial-parallel) converter 102 for converting serial control data from the battery attachment 64 into parallel data, and two regulators 104a and 104b for supplying a stable power source voltage to the microcomputer 101. One (104a) of these two regulators 104a and 104b provides a high output level for realizing a high-speed operation of the microcomputer 101. The other regulator 104b provides a low output level for realizing a low power consumption of the microcomputer 101.

Outputs from these regulators 104a and 104b are appropriately switched by a voltage selection switch 104c.

The operation of the photographing system with the above-mentioned arrangement will be described below.

The battery attachment of the control coupler is attached to a battery case 14 of the camera main body 1, and the respective devices are connected, as shown in FIG. 13, thus allowing an operation. In accordance with an ON detection signal from the film photographing adapter 20, the microcomputer 101 of the camera main body 1 ignores instructions from the operation buttons 6 and 10 of the camera main body 1, and accepts control signals from the switches 24 to 29' of the film photographing adapter 20.

In this embodiment, a photographing operation is performed in response to the control signal from the release switch 24 of the film photographing adapter 20. However, when the release button 6 of the camera main body 1 is operated, no photographing operation is started.

More specifically, as described above, when the camera 1 is connected to the film photographing adapter 20 via the control coupler 60, the control signal CPUON of the microcomputer 101 in the camera main body 1 is set at LOW level.

Thus, the regulator 602 in the battery attachment 64 is enabled, and the microcomputer 601 is set in an operative state.

When the operation control of the camera main body 1 is performed in accordance with a control signal from the film photographing adapter 20, the control signal from the photographing adapter 20 is fetched by the lo microcomputer 601 of the battery attachment 64, and is encoded to predetermined control data. The control data is serially transmitted to the S/P converter 102 in the camera main body 1 via the serial communication line.

The microcomputer 101 of the camera main body 1 fetches data from the S/P converter 102, and controls the camera main body 1 on the basis of this data.

In contrast to this, when the operation buttons 6 and 10 of the camera main body 1 are operated, the microcomputer 101 in the camera main body 1 does not accept instructions based on the operations of these operation buttons 6 and 10, and does not perform a corresponding operation.

When a negative state is selected by the negative-positive selection switch 25 of the film photographing adapter 20, the negative-positive reversal circuit in the camera 1 is operated to negative-positive reverse a photographed output. On the other hand, when a positive state is selected, a photographed output is directly output.

An output video signal is recorded on a magnetic disk in the camera main body 1, and is reproduced on an external monitor. When the reproduced image is not satisfactory, the erase button is operated to erase the video signal recorded on the magnetic disk like in the above-mentioned embodiment.

In this embodiment, operations of the operation buttons 6 and 10 of the camera main body 1 are inhibited in accordance with the ON detection signal from the film photographing adapter 20. Not only the operations of the operation buttons 6 and 10 of the camera main body 1 but also the operation of the external remote controller detected by the battery attachment 64 may be inhibited in accordance with the ON detection signal.

As described above, in this embodiment, the operations of the operation buttons 6 and 10 of the camera itself for the camera main body 1 attached to the film photographing adapter 20 are inhibited in accordance with the ON detection signal representing an ON state of the fluorescent lamp 42 of the film photographing adapter 20.

Therefore, for example, a photographing operation by operating the operation buttons 6 and 10 of the camera 1 is inhibited in the camera film photographing mode, and a photographing operation in a shaken state of the camera 1 can be prevented.

The film photographing adapter 20 can precisely support the camera main body 1 with respect to the film placing surface, and comprises a light source (back light) for a transmission original such as a film F. Therefore, a closeup photographing operation of the film can be very precisely and easily performed.

In the above embodiment, the operations of the operation buttons 6 and 10 of the camera 1 are inhibited when the fluorescent lamp 42 of the film photographing adapter 20 is turned on. However, the operations of the operation buttons 6 and 10 of the camera 1 may be inhibited when the camera 1 is attached to the film photographing adapter 20.

The height of an optical chamber in the holder 22 may be varied in accordance with an object other than a transmission original. In this case, light from a flash device of the camera may be reflected in place of the fluorescent lamp 42.

According to a photographing adapter of the present invention, a closeup photographing operation of a camera film can be very easily and precisely performed.

According to a photographing system of the present invention, operations of operation buttons of the camera itself are inhibited when a closeup photographing operation is performed using the camera, and the operations are performed using the operation buttons of the film photographing adapter. Thus, the camera can be prevented from being shaken during the closeup photographing operation.

In the above embodiment, the SV camera comprising a negative-positive reversal function is used. However, when a film having a positive image such as a slide film is to be photographed, the negative-positive reversal function is unnecessary. Thus, a photographing operation can be performed using an SV camera having no negative-positive reversal function or a silver chloride camera.

As described above, a photographing device according to the present invention, comprises photographing means, held at a predetermined closest distance from an object placing unit, for photographing an object, illumination means for illuminating the object placed on the object placing unit, and correction means for correcting a luminance distribution of an object image incident on the photographing means. Therefore, the central portion of a negative-positive reversed image can be prevented from being darkened due to a decrease in circumferential light amount caused by a lens, and a photographing operation can be satisfactorily performed using a light source which maintains a uniform luminance.

Since the light source performs correction for uniforming the luminance distribution, when a slide film is photographed in place of a negative film, a circumferential portion of a film image can be prevented from being darkened, and a photographing operation can be similarly satisfactorily performed.

What is claimed is:

1. A photographing device comprising:
    a camera mounting unit on which a camera is detachably mounted and having a receiving portion which covers a portion of said camera on which a lens unit is provided, said camera mounting unit having operation buttons corresponding to operation buttons of said camera;
    a light source unit arranged to be separated from said camera mounting unit by a predetermined distance; and
    a table which is arranged between said light source unit and said camera mounting unit, and on which an object is placed,
    wherein when said camera is mounted on said camera mounting unit, an operation of said camera using said operation buttons of said camera is inhibited, and the object placed on said table is illuminated by said light source unit and can be photographed by an operation using said operation buttons of said camera mounting unit.

2. A photographing device according to claim 1, wherein said camera includes an image sensing means.

3. A photographing device for photographing an object while a photographing unit is held at short range from the object, comprising:
    an object placing unit for holding the object within a photographing region of said photographing unit;
    support means for supporting said photographing unit at a predetermined short range from said object placing unit;
    shield means, arranged around the photographing region, for shielding external light incident on the photographing region; and
    an observation window for viewing the object held by said object placing unit from outside of said shielding means, said observation window being formed in a portion of said shielding means.

4. A photographing device according to claim 3, further comprising operation switches arranged close to said observation window.

5. A photographing device for photographing an object while a photographing unit is held at short range from the object, comprising:
    an object placing unit for holding the object within a photographing region of said photographing unit;
    holding means having an exterior portion for holding said photographing unit at predetermined short range from said object placing unit, and shielding external light incident on the photographing region; and
    an observation window for viewing the object held by said object placing unit from outside of said shielding means, said observation window being formed in said exterior portion of said holding means.

6. A photographing device according to claim 5, further comprising operation switches arranged close to said observation window.

7. A photographing device comprising:
    an object placing unit for placing an object;
    photographing means, held at predetermined short range from said object placing unit, for photographing the object, said photographing means including a photographing lens optical system;
    illumination means for illuminating the object placed on said object placing unit;
    diffusing means for diffusing light emitted from said illuminating means; and
    correction means for correcting a luminance distribution of an object image incident on said photographing means, wherein said correction means has luminance distribution characteristics for correcting a decrease in circumferential light amount caused by said photographing lens optical system.

8. A device according to claim 7, wherein said illumination means is arranged on a side opposite to said photographing means with respect to said object placing unit, and said correction means is arranged between said photographing means and said illumination means.

9. A photographing device according to claim 7, wherein said correction means is arranged between said illumination means and said photographing means.

10. A photographing device according to claim 8, wherein said correction means is arranged in a region other than the vicinity of said object.

11. A photographing device according to claim 9, wherein said correction means is arranged in a region other than the vicinity of said object.

12. A photographing device according to claim 8, wherein said correction means is arranged in a region other than the vicinity of said photographing means.

13. A photographing device according to claim 9, wherein said correction means is arranged in a region other than the vicinity of said photographing means.

14. A photographing device for photographing an object while a photographing unit is held at short range from the object, comprising:
   an object placing unit for holding the object within a photographing region of said photographing unit;
   support means for supporting said photographing unit at predetermined short range from said object placing unit; and
   photometric light guiding means, arranged between photometric means of said photographing unit and the object, for guiding a light amount on the photographing region to said photometric means of said photographing unit.

15. A photographing device for photographing an object while a photographing unit is held at a short range to the object, said device comprising:
   a photographing unit including photometric means;
   an object placing unit for holding the object within a photographing region of said photographing unit;
   support means for supporting said photographing unit at a predetermined short range from said object placing unit; and
   photometric correction means, arranged between said photometric means of said photographing unit and the object, for correcting an intensity distribution of light incident on said photometric means from the photographing region of said photographing unit.

16. A photographing device according to claim 15, wherein said photometric correction means regulates an amount of light received from the photographing region in accordance with a length of an optical path along which said light is received, wherein light received along at least one optical path is limited with respect to light received along a longer optical path.

17. A photographing device according to claim 16, wherein said photometric correction means comprises a plate member which shades light.

18. A photographing device according to claim 17, wherein said plate member has a window of trapezoidal shape.

19. A photographing device according to claim 16, wherein said photometric correction means comprises a transparent member in which transmitivity is non-uniform.

20. A photographing device for photographing a film placed at predetermined short range, comprising:
   a film placing unit for holding the film within a photographing region;
   film guide means for allowing the film to be able to be inserted from two orthogonal directions on said film placing unit; and
   aligning means consisting of a plurality of pressing portions for aligning the film by pressing the film brought into said film placing unit by said film guide means against said film placing unit,
   wherein said pressing portions press the film at a plurality of positions located outside of the photographing region and along a diagonal line that divides the photographing region.

21. A photographing device according to claim 20, wherein each of said plurality of pressing portions comprises a blade spring.

22. A photographing device according to claim 20, wherein each of said plurality of pressing portions has a projection having an approximately circular cone shape.

23. A photographing device according to claim 21, wherein each of said plurality of pressing portions has a projection having an approximately circular cone shape.

* * * * *

UNITED STATES PATENT AND TRADEMARK OFFICE
CERTIFICATE OF CORRECTION

PATENT NO. : 5,293,242
DATED : March 8, 1994
INVENTOR(S) : Toshiharu Mamiya

It is certified that error appears in the above-indentified patent and that said Letters Patent is hereby corrected as shown below:

On the title page, item

[56] REFERENCES CITED:

Insert: --5,067,020  11/1991  Funston--.

COLUMN 2:

Line 2, "closed" should read --disclosed--.

COLUMN 3:

Line 38, "prebent" should read --present--.
Line 58, "lo" should be deleted.

COLUMN 5:

Line 58, "lo" should be deleted.

UNITED STATES PATENT AND TRADEMARK OFFICE
CERTIFICATE OF CORRECTION

PATENT NO. : 5,293,242
DATED : March 8, 1994
INVENTOR(S) : Toshiharu Mamiya

It is certified that error appears in the above-indentified patent and that said Letters Patent is hereby corrected as shown below:

COLUMN 9:

Line 38, "as" should read --As--.

COLUMN 18:

Line 20, "lo" should be deleted.

Signed and Sealed this

Twenty-seventh Day of September, 1994

Attest:

BRUCE LEHMAN

*Attesting Officer*  *Commissioner of Patents and Trademarks*